(12) United States Patent
Nübling

(10) Patent No.: US 12,196,283 B2
(45) Date of Patent: Jan. 14, 2025

(54) FASTENING ELEMENT AND DECOUPLING ASSEMBLY

(71) Applicant: AUDI AG, Ingolstadt (DE)

(72) Inventor: Philipp Nübling, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/262,415

(22) PCT Filed: Dec. 14, 2021

(86) PCT No.: PCT/EP2021/085578
§ 371 (c)(1),
(2) Date: Jul. 21, 2023

(87) PCT Pub. No.: WO2022/161689
PCT Pub. Date: Aug. 4, 2022

(65) Prior Publication Data
US 2024/0093743 A1   Mar. 21, 2024

(30) Foreign Application Priority Data

Feb. 1, 2021   (DE) .......................... 102021102205.3

(51) Int. Cl.
*F16F 1/373*   (2006.01)
*F16F 15/08*   (2006.01)

(52) U.S. Cl.
CPC ............ *F16F 1/3732* (2013.01); *F16F 15/08* (2013.01)

(58) Field of Classification Search
CPC ... F16F 1/3732; F16F 15/08; Y10T 24/44026; B60R 13/0838
See application file for complete search history.

(56) References Cited

U.S. PATENT DOCUMENTS

| 2,797,605 | A | | 7/1957 | Metze, Jr. et al. |
| 3,091,795 | A | * | 6/1963 | Budwig ................. F16L 5/027 439/550 |
| 7,370,878 | B2 | * | 5/2008 | Nakazawa ............ B60R 21/213 16/2.5 |
| 9,188,150 | B2 | | 11/2015 | Millet et al. |
| 10,575,598 | B2 | * | 3/2020 | Choi ................... A44B 13/0088 |
| 2020/0355238 | A1 | | 11/2020 | Dull et al. |

FOREIGN PATENT DOCUMENTS

| DE | 3904036 A1 | 8/1990 |
| DE | 4029587 A1 | 3/1991 |
| DE | 19806210 A1 | 8/1999 |
| DE | 19916098 A1 | 10/2000 |
| DE | 10058520 C1 | 7/2002 |
| DE | 102005010433 A1 | 9/2006 |

(Continued)

OTHER PUBLICATIONS

Examination Report issued on Sep. 14, 2021, in corresponding German Application No. 102021102205.3, 4 pages.

(Continued)

*Primary Examiner* — Robert Sandy
(74) *Attorney, Agent, or Firm* — Maier & Maier, PLLC

(57) ABSTRACT

A fastening element and a decoupling assembly, the fastening element for add-on parts connected to a body structure of a motor vehicle, a method for producing the de-coupling assembly and assembling it.

19 Claims, 2 Drawing Sheets

(56) References Cited

FOREIGN PATENT DOCUMENTS

| | | |
|---|---|---|
| DE | 102009017806 A1 | 7/2010 |
| DE | 102016113797 A1 | 2/2018 |
| DE | 102019111078 A1 | 10/2020 |
| DE | 102019113663 A1 | 11/2020 |
| EP | 2937616 A1 | 10/2015 |
| EP | 3736464 A1 | 11/2020 |
| WO | 2010022841 A1 | 3/2010 |

OTHER PUBLICATIONS

International Search Report and Written Opinion issued on May 2, 2022, in corresponding International Application No. PCT/EP2021/085578, 18 pages.
International Preliminary Report on Patentability issued on Jul. 31, 2023, in corresponding International Application No. PCT/EP2021/085578, 15 pages.

\* cited by examiner

FASTENING ELEMENT AND DECOUPLING ASSEMBLY

FIELD

The present invention relates to a fastening element and a decoupling assembly comprising the fastening element for add-on parts connected to a body structure of a motor vehicle, a method for producing the decoupling assembly and assembling it.

BACKGROUND

In order to reduce the noise occurring during the operation of an internal combustion engine, it is important that add-on parts flanged on the engine block are decoupled from the engine block in terms of vibration. For this purpose there are decoupling elements between the screw head of a fastening screw and the component held by the fastening screw. Other, in particular smaller, add-on parts of a vehicle can also be fastened on to the vehicle by means of a decoupling element, for example a pump or heat pump of an electric machine or a valve on another component of a vehicle. By means of this decoupling between the add-on part, for example the valve, and another vehicle component, no disturbing noises are emitted into the interior during operation.

The assembly of a conventional decoupling element requires additional manufacturing time since the nut or screw first has to be set and then tightened. Furthermore, an additional tool (wrench or torque wrench) is required for the assembly process.

DE 10 2019 113 663 A1 relates to a spacer for a fastening arrangement for fastening a mounting part on a carrier part in a vibration-damped manner. The spacer includes a base body having a first flange area and a second flange area which is opposite viewed in the longitudinal direction of the base body and having a passage in which a fastener connected or to be connected to the carrier part can be accommodated at least in areas. The base body is embodied in at least two parts and includes a first body part and at least one further, second body part, wherein the body parts are detachably connectable to one another to form the base body, and wherein a gap area is provided between the first and second flange area when the body parts are in the connected state, by which the border of a fastening hole formed in the mounting part can be accommodated at least in areas.

DE 10 2009 017 806 A1 discloses a fastening element for fixing a component on a supporting part. The fastening element includes an anchoring element fixable on the supporting part. Furthermore, a radial compensating element is provided for compensating for a radial offset between the component and the anchoring element. Finally, the fastening element also has a holding element for holding the component.

DE 10 2016 113 797 A1 discloses a fastening unit for sutureless fastening of tissue to bones, having an anchor element that can be fixed to a bone, a holding element that can be coupled to the anchor element in order to attach a tissue section to the bone, wherein the anchor element and the holding element can be locked with one another and form a holding area between them, in which the tissue section can be accommodated.

DE 10 2019 111 078 A1 relates to a fastening arrangement having a damping effect, which consists of two identical fastening units, each with a central first through-opening. Each fastening unit comprises a mounting element and a damping element. The mounting element is disc-shaped having a central second through-opening and an identical detent structure extends from a first side of each mounting element. The damping element is disc-shaped having a central third through-opening and is at least partially arranged in the central second through-opening of the mounting element. Due to this construction, the two fastening units can be fastened on one another via the first sides facing toward one another using the identical detent structure of the respective mounting elements having the first component arranged in between.

DE 10 2005 010 433 A1 relates to a damping bearing for vibration-decoupled and noise-decoupled fastening of a sheet metal component. The damping bearing consists of two bearing parts made of elastomeric material, which hold the sheet metal component in the area of a through-opening and which are penetrated by a fastening means. The damping bearing has two identical bearing parts, which in the area between the penetration opening and the radial support along the circumference include at least one tooth and a number of tooth engagement troughs equal to the number of teeth on the circumference and arranged adjacent to this tooth or this teeth and oppositely congruent to the tooth.

DE 100 58 520 C1 presents a fastening device for fastening a disc-shaped component in a receiving channel of a receiving component, wherein the fastening device is seated in a hole of the component and through-holes aligned thereto in the walls of the receiving channel, wherein the diameter of the hole in the disc-shaped component is smaller than that of the through-holes in the receiving component. Two identical clips are provided, which can be inserted into the holes from opposite ends. Each clip includes an approximately ring-cylindrical section and a hollow shaft. The ring-cylindrical section seated in a through-bore of a wall includes an approximately radial, approximately ring-shaped shoulder which bears against the facing side of the disc-shaped component. The shaft includes at least two circumferentially spaced-apart legs extending through the hole of the disc-shaped component and the through-hole of the other wall, wherein the space between adjacent legs can receive a leg of the other clip. On the outside, the legs includes a radially projecting section which can be brought into engagement with the hole wall of the hole of the disc-shaped component. The legs, which are arranged interleaved when the clips are plugged into one another, are secured against being pulled apart by cooperating detent means.

WO 2010 022 841 A1 relates to a fastening arrangement for fastening a component B on a component A with automatic compensation of tolerances in the distance (S) between the component B and the component A, which includes the following features: a.) a receiving element and an adjusting element, which can be screwed to the receiving element via a first pair of threads in a first thread direction, while b.) a fastening screw can be inserted through an opening in the receiving element and adjusting element, which can be screwed into the receiving element via a second pair of threads in a second thread direction opposite to the first and can be connected to the adjusting element by a detachable drag connection in order to also rotate the adjusting element when the fastening screw is turned and thereby move it into contact with the component B, and the c.) adjusting element of which consists of a drag element arranged in a rotationally-fixed and floating manner within a threaded element, so that misalignment of the fastening screw can be compensated for upon insertion into the adjusting element.

A two-part fastener made of resilient plastic is known from US 2 797 605 A, including a pair of identical fastener elements, wherein each element comprises a head and a shaft, wherein each shaft consists of a plurality of shaft sections spaced apart from one another laterally at a sufficient distance in order to receive the sections of the shaft of the other fastening element therebetween. Each of the shaft sections comprises a surface which forms a shaft periphery with the other shaft sections, wherein the shaft sections have radial edges which are arranged at angles in relation to one another, and each of the radial edges in the vicinity of the end of the shaft section spaced apart from the head is provided with a plurality of tooth formations over a substantial part of the shaft length in the direction of the head. Each tooth formation includes a surface at the radial edges, which is arranged at an acute angle to the longitudinal axis of the fastening element and points in a direction away from the head, in order to facilitate the insertion of the shaft sections of the fastening element into engagement with the shaft sections of the other fastening element.

SUMMARY

Against this background, the invention has set itself the object of providing a fastening device for a decoupling element and a decoupling assembly for add-on parts connected to a body structure of a motor vehicle, which is simple to produce and can be assembled with little expenditure on components and time.

The subject matter of the invention is a component which is configured to be assembled with a second identical component in order to form a fastening structure for a decoupling element for an add-on part connected to a body structure of a motor vehicle. According to the invention, a body structure of a motor vehicle can be any area in the vehicle, for example an engine compartment, a trunk, or another area in the vehicle, such as a floor panel area, a roof area, a side paneling area, or also another component, such as a technical recess, for example in the form of an area of the trunk. Depending on the design of the vehicle, a trunk can be arranged in the front or rear area of the vehicle, as viewed in the direction of travel.

The component according to the invention consists of a thermoplastic. The component according to the invention consists of a hard material and provides the strength of the assembly. In one embodiment, the thermoplastic is polyamide (PA), polyamide 6 (PA6), or polyamide 66 (PA66), wherein glass fiber-reinforced PA, PA6, or PA66 can also be used.

The component according to the invention comprises a base plate which includes a central opening. In one embodiment, the base plate is round. In another embodiment, the outer contour of the base plate is a polygon having an even number of corners, for example four, six, or eight corners.

In one embodiment, the central opening is a circular opening. In another embodiment, the outer contour of the central opening is polygonal having at least three corners, for example a triangular, square, pentagonal, hexagonal, or octagonal opening.

The base plate includes at least two identically shaped cylinder wall segments arranged equidistantly from one another on a circular line coaxial to its center (and thus to the center of the central opening) on its upper side and recesses arranged between each two cylinder wall segments. The length of the circular arc between two cylinder wall segments is at least as long as the length of an upper edge of a cylinder wall segment. In one embodiment, the length of the circular arc between two cylinder wall segments is the same as the length of an upper edge of a cylinder wall segment.

Each of the cylinder wall segments includes a detent lug on its upper edge, which is configured to engage in a corresponding recess of the base plate of a second identical component and to lock the two components together. If the length of the circular arc between two cylinder wall segments and the length of the upper edge of the cylinder wall segments of the component are equal, the gaps between the cylinder wall segments of both components are filled by the cylinder wall segments of the respective other component, so that a closed hollow cylinder is formed. If the length of the circular arc between two cylinder wall segments is greater than the length of the upper edge of the cylinder wall segments, then gaps remain between the cylinder wall segments after they have been joined.

The cylinder wall segments have an identical shape and are arranged equidistantly from one another, so that the length of the circular arc between two cylinder wall segments is at least as great as the length of an upper edge of a cylinder wall segment. In one embodiment, the upper edge of the cylinder wall segments has the same length as their lower edge. In other embodiments, the length of the upper edge of the cylinder wall segments is less than the length of the lower edge, i.e., the cylinder wall segments taper upwards.

In one embodiment, the component according to the invention includes two identical and equidistantly arranged cylinder wall segments. In one embodiment, the component has a mirror-symmetrical structure, wherein the plane of symmetry extends through the vertical axis (Z-axis) of the component.

In another embodiment, the component according to the invention includes more than two identical and equidistantly arranged cylinder wall segments. In a further embodiment, the component according to the invention includes three identical and equidistantly arranged cylinder wall segments. In a further embodiment, the component according to the invention includes four identical and equidistantly arranged cylinder wall segments.

In one embodiment of the component according to the invention, the base plate includes centering elements arranged at the edge of the opening between the equidistantly arranged cylinder wall segments.

The side of each cylinder wall segment facing toward the central opening carries a spring element. In one embodiment, the spring elements are arranged above the level of the opening in the base plate. In one embodiment, the spring elements are tongues that extend parallel to the base plate. In one embodiment, the support structure includes at least two equidistantly arranged spring elements. In a further embodiment, the support structure includes more than two spring elements, for example three or four spring elements.

The spring elements are configured to engage in thread flanks of the bolt when a threaded bolt or coarse threaded bolt is introduced into the central opening of the component. As a result, the component can be fixed on the bolt and no screwing process is required when assembling the component or the decoupling assembly. The fastening structure is simply plugged onto a threaded bolt or coarse threaded bolt. The hooking in the thread flanks is carried out by the spring elements, which are arranged radially inside the fastening structure.

In one embodiment, in the area of the spring elements, the width of the central opening is at least as large as or greater than the width of the spring elements. As a result, the spring elements can be demolded better in the injection molding tool.

In one embodiment of the component according to the invention, the lower side of the base plate includes stiffening ribs.

The subject matter of the invention is also a decoupling assembly comprising two identical components according to the invention and a decoupling element. The decoupling assembly according to the invention comprises two identical components according to the invention and a decoupling element made of an elastomer. The decoupling element consists of a soft, elastic material and causes vibration decoupling of the attachment structure and damping of vibrations and structure-borne noise. In one embodiment, the elastomer is an ethylene propylene diene rubber (EPDM), a thermoplastic elastomer (TPE), or a crosslinked olefin-based thermoplastic elastomer (TPV).

In one embodiment, the decoupling element has the shape of a cylinder. In another embodiment, the decoupling element is in the form of a polygonal prism, for example a prism having a square, hexagonal, or octagonal base. In one embodiment, the decoupling element includes a circumferential groove on its outer surface, which is intended to snap into the edge of a recess of a holder and to fix the decoupling element in the recess.

The decoupling element includes a central cylindrical channel, the diameter of which corresponds at least to the outside diameter of the hollow cylinder formed by the cylinder wall segments of the fastening structure. The diameter can also be larger. The resulting gap between the outside diameter of the cylinder wall segments and the inside diameter of the decoupling element additionally promotes decoupling. The length of the central channel corresponds to the height of the cylinder wall segments of the fastening structure, i.e., the length of the hollow cylinder of the fastening structure.

In the decoupling assembly according to the invention, the decoupling element encloses the hollow cylinder formed from the cylinder wall segments of the fastening structure. The base plates of the components of the mounting structure contact the upper and lower sides of the decoupling element and fix it in the decoupling assembly.

The subject matter of the invention is also a method for vibration decoupling of an add-on part on a body structure of a motor vehicle. In the method, a decoupling element made of an elastomer and having a central cylindrical channel is introduced into a recess of a holder of the add-on part and fixed there, for example locked with the edge of the recess. Two identical components according to the invention are then inserted into the central cylindrical channel of the decoupling element from opposite sides of the recess of the holder of the attachment and locked together to form a decoupling assembly. The detent lugs of the first component engage in the corresponding recesses of the second component and the detent lugs of the second component engage in the corresponding recesses of the first component. The decoupling assembly is then pushed onto a threaded bolt attached to a body structure of the motor vehicle. As a result, spring elements of the decoupling assembly engage in thread flanks of the bolt and fix the decoupling assembly. According to the invention, the threaded bolt can also be designed as a coarse threaded bolt.

In this case, the body structure can be any area in the vehicle, for example an engine compartment, a trunk, or another area in the vehicle, such as a floor panel area, a roof area, a side paneling area, or another component, such as a technical recess, for example in the form of an area of the trunk.

The add-on part to be decoupled and fastened is a component located in the vehicle, for example a valve, an electrically driven water pump, a sensor, a control unit, or a pipe.

During assembly, the decoupling assembly only has to be plugged on over a threaded or coarsely threaded bolt, wherein the spring elements made of plastic in the interior of the decoupling assembly hook into the thread flanks of the bolt. An anti-twist device is not necessary, since the decoupling element rests on the holder and develops a frictional moment due to the surface pressure, so that the element cannot loosen by itself (for example due to vibration excitation while driving). The two halves of the mounting structure of the decoupling assembly are each plugged into one another from one side of the holder in the central cylindrical channel of the decoupling element for assembly (and before being plugged on), wherein the detent lugs of each half lock into the recesses in the bottom of the respective other half.

The decoupling assembly according to the invention saves one spacer bushing, one washer, and one nut or screw per decoupling assembly in comparison to decoupling elements of the prior art. The assembly of a decoupling assembly is simplified and the plastic construction results in a low weight. During the assembly process, screwing on a nut or screw is replaced by plugging on the decoupling assembly, which results in a shortening of the manufacturing time. In addition, there is no need to tighten the nut or screw by means of a torque wrench. Various small parts and assembly tools can be saved during assembly. Further advantages and designs of the invention result from the description and the accompanying drawings.

It is apparent that the above-mentioned features and the features still to be explained hereinafter are usable not only in the particular specified combination but rather also in other combinations or alone, without leaving the scope of the present invention.

BRIEF DESCRIPTION OF THE FIGURES

The invention is schematically illustrated in the drawings with the aid of embodiments and is described further with reference to the drawings. In the figures.

DETAILED DESCRIPTION

Figure 1:
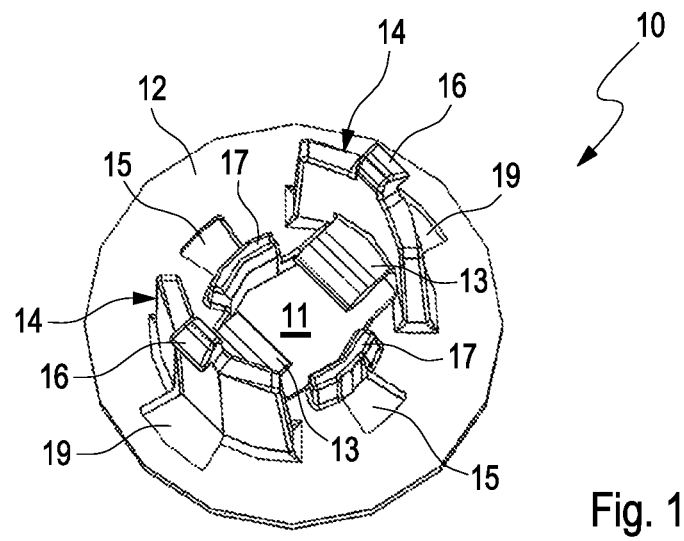
FIG. 1 shows a schematic representation of an embodiment of the component according to the invention.

FIG. 1 shows an embodiment of the component 10 according to the invention. The component 10 shown can be plugged together with a second identical component 10. The component 10 consists of a hard thermoplastic, e.g., PA, PA6, PA66, etc., with or without glass fiber content.

The component 10 comprises a base plate 12 having a central opening 11. In the embodiment shown, the base plate 12 is round and the central opening 21 is an elongated opening having a circular central part. In another embodiment, the outer contour of the base plate 12 is a polygon having an even number of corners, for example four, six, or eight corners. The central opening 11 can also have a polygonal contour having at least three corners, for example can be triangular, square, pentagonal, hexagonal, or octagonal.

On the upper side of the base plate 12 there are two cylinder wall segments 14 on a circular line coaxial with the center of the opening 11. In the embodiment shown, the opening 11 extends from the base of one cylinder wall segment 14 to the base of the other cylinder wall segment 14. The cylinder wall segments 24 are identically shaped and arranged equidistantly from one another, so that the length of the circular arc between two cylinder wall segments 14 is equal to the length of an upper edge of a cylinder wall segment 14. In the embodiment shown, the length of the upper edge of the cylinder wall segments 14 is less than the length of the lower edge, i.e., the cylinder wall segments 14 taper upwards. In one embodiment, the upper edge of the cylinder wall segments 14 has the same length as their lower edge.

There is a first recess 15 in the base plate 12 between each two cylinder wall segments 14; and each of the cylinder wall segments 14 includes a detent lug 16 on its upper edge. The detent lug 16 is configured to engage in a corresponding first recess 15 of a second identical component 10 when this is pushed onto the component 10 and to lock the two components 10 together. The gaps between the cylinder wall segments 14 of both components 10 are filled by the cylinder wall segments 14 of the respective other component 10, so that a closed hollow cylinder is formed.

A second recess 19 is located in the base plate 12 on the rear side of each cylinder wall segment 14. The recess 19 facilitates the production of the component 10 in the injection molding process by avoiding undercuts that require additional slides in the injection molding tool. However, the component could certainly also be produced without the recess 19.

A spring element 13 is arranged on the upper side of the base plate 12 on the side of each of the cylinder wall segments 14 facing toward the opening 11. The spring elements 13 are configured to engage in thread flanks of the threaded bolt 300 when a threaded bolt 300 is introduced into the opening 11. The embodiment shown includes two spring elements 13 which are attached on opposite sides of the opening 11. In the embodiment shown, the spring elements are arranged above the opening 11. In the embodiment shown, the spring elements 13 are designed as tongues which extend parallel to the base plate 12.

In the embodiment shown, centering elements 17 are arranged between the spring elements 13 on the upper side of the base plate 12 at the edge of the opening 11. These guide a threaded bolt 300, which enters through the central opening 11 of the component 10 and prevent it from getting caught.

In the embodiment shown, the component 10 has a mirror-symmetrical structure, wherein the plane of symmetry extends through the vertical axis (Z-axis) of the component 10.

Figure 2:
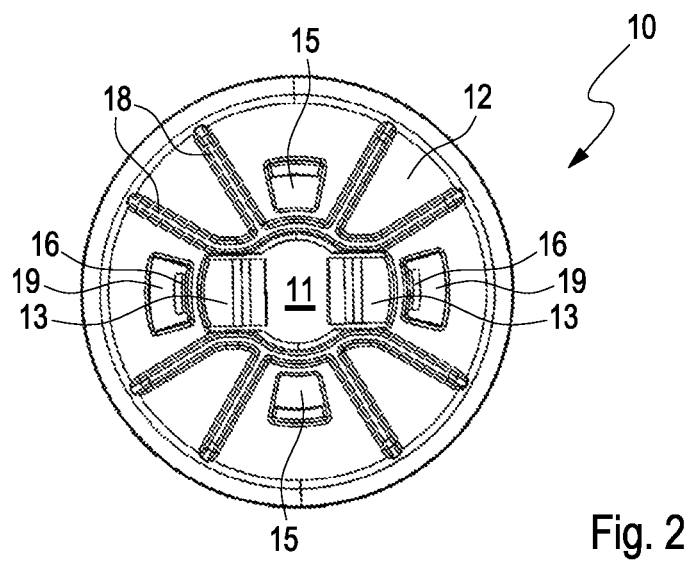
FIG. 2 shows a view from below of an embodiment of the component according to the invention.

FIG. 2 shows a view from below of an embodiment of the component 10 according to the invention.

The component 10 comprises a base plate 12 having a central opening 11. In the embodiment shown, the base plate 12 is round and the central opening 21 is an elongated opening having a circular central part.

In the view from below, the spring elements 13 and the detent lugs 16, which are arranged on the cylinder wall segments 14 (not visible in this illustration) and are located above the plane of the base plate 12, can be clearly seen, as can the first recesses 15 and the second recesses 19 in the base plate 12. Stiffening ribs 18, which increase the rigidity of the component 10, are arranged on the lower side of the base plate 12.

Figure 3:
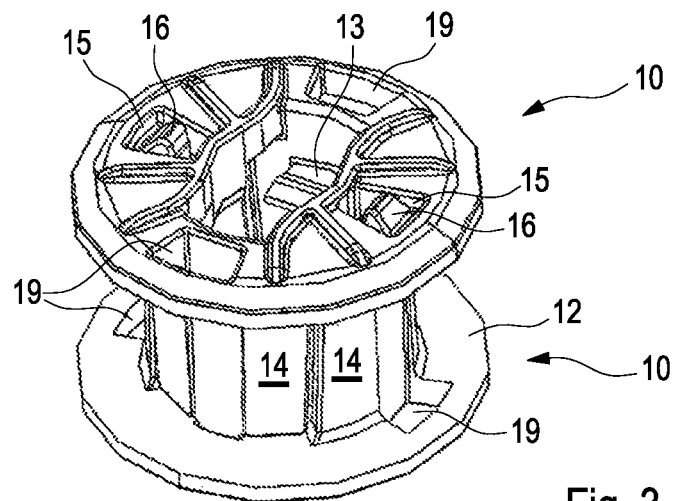
FIG. 3 shows a schematic representation of two components according to the invention that have been plugged together.

FIG. 3 shows an assembly made up of two plugged-together components 10 according to the invention. The detent lugs 16 of the two components 10 engage in the corresponding first recesses 15 of the respective other component 10 and lock the two components 10 together. The cylinder wall segments 14 of both components 10 form a closed hollow cylinder.

Figure 4:
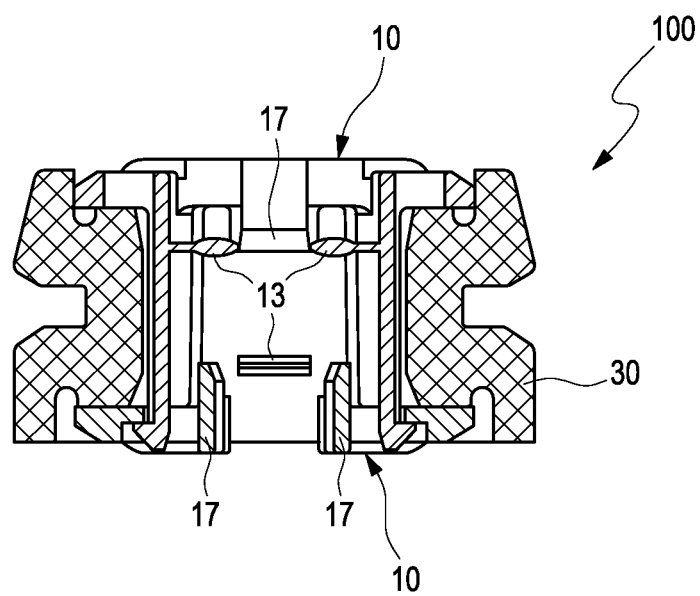
FIG. 4 shows a longitudinal section of a decoupling assembly which comprises two components according to the invention.

FIG. 4 shows a longitudinal section through a decoupling assembly 100, which comprises two plugged-together components 10 and a decoupling element 30. The decoupling element 30 consists of a soft, elastic material, e.g., EPDM, TPE, or TPV. The two components 10, 30 of the decoupling assembly 100 have different functions. The hard component 10 functions as a support structure and provides the strength of the assembly 100, the soft component 30 causes a vibration decoupling between a holder 200 and the components 10 and ensures the damping of vibrations and structure-borne noise. The decoupling element 30 encloses the hollow cylinder formed from the cylinder wall segments 14 of the plugged-together components 10. If a threaded bolt 300 is inserted into the central opening of the decoupling assembly 100, the centering elements 17 guide it and prevent it from hooking. The spring elements 13 engage in thread flanks of the threaded bolt 300 and thereby fix the decoupling assembly 100 on the threaded bolt 300.

Figure 5:
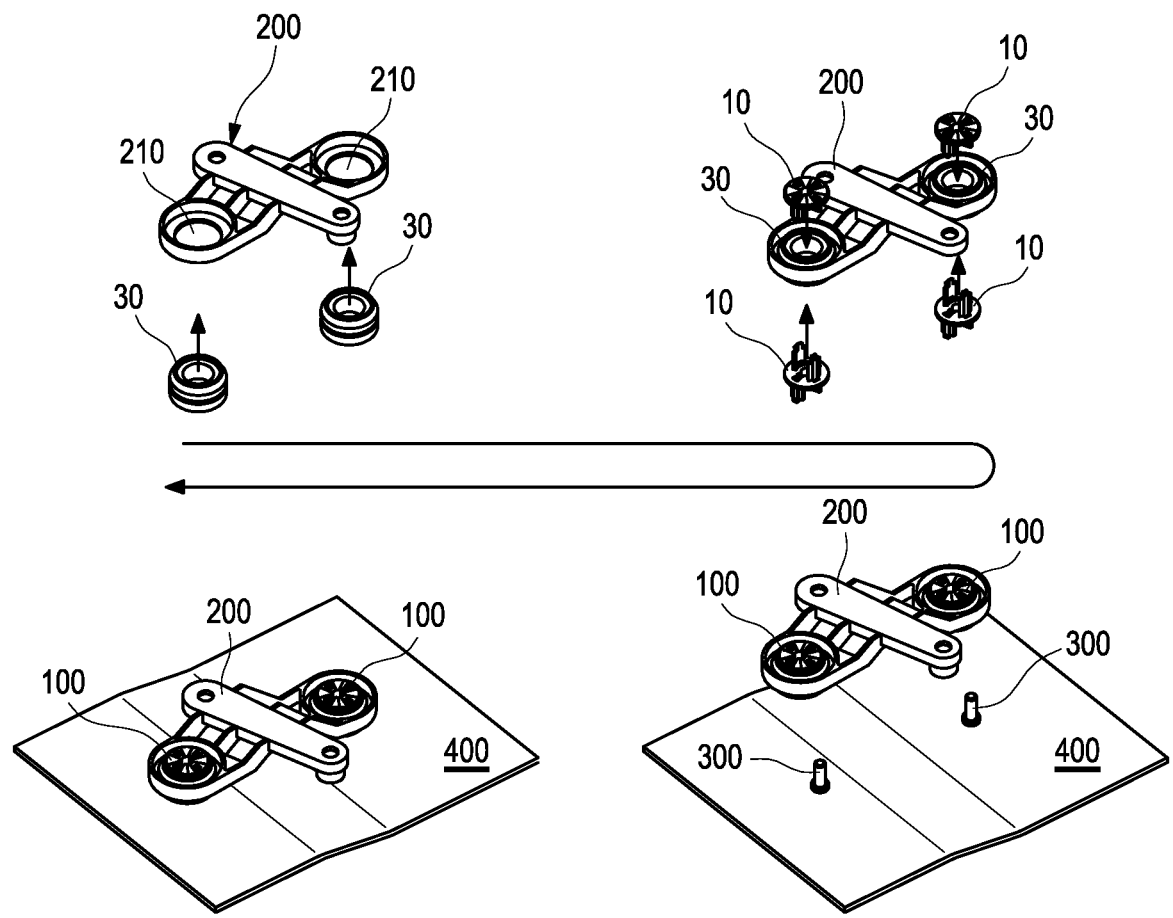
FIG. 5 shows work steps (assembly steps) of the method according to the invention.

FIG. 5 shows work steps of the method according to the invention for vibration decoupling of a holder 200 connected to a body structure 400 in a motor vehicle.

In the figure at the top left, a holder 200 for an add-on part is shown, which includes recesses 210. First, two identical decoupling elements 30 are introduced into the recesses.

The figure at the top right shows how in each case two identical components 10 according to the invention are then inserted from opposite sides through the central openings of the decoupling elements 30 and the recesses 210 of the holder 200 and locked together to form decoupling assemblies 100.

The figure at the bottom right shows the mounting of the holder 200 on a body structure 400 of a motor vehicle. To do this, the holder 200 is simply plugged onto threaded bolts 300 that are attached to the body structure 400. The spring elements 13 contained in the decoupling assemblies 100 engage in thread flanks of the threaded bolt 300 and thereby fix the holder 200 on the threaded bolt 300, without additional components or further work steps.

The figure at the bottom left shows the result of the assembly process.

The body structure 400 on which the threaded bolt 300 is mounted can be part of an engine compartment or a technical recess of a vehicle, for example. For example, after the holder 200 has been mounted, the technical recess can accommodate a repair tool set by means of this holder 200. For example, a valve can be fastened on the holder 200 using the components 10 according to the invention in the technology recess, for example in order to cool a control unit.

List of Reference Numerals 10 component
11 opening 12 base plate
13 spring element
14 cylinder wall segment
15 first recess
16 detent lug
17 centering element
18 stiffening ribs
19 second recess
30 decoupling element
100 decoupling assembly
200 holder
210 recess
300 threaded bolt
400 body structure

The invention claimed is:

1. A component made of a thermoplastic, which is configured to be assembled with a second identical component and a decoupling element made of an elastomer to form a decoupling assembly for an add-on part of a motor vehicle connected to a body structure, comprising
   i) a base plate including a central opening,
   ii) at least two identically shaped cylinder wall segments arranged equidistantly from one another on the upper side of the base plate on a circular line coaxial with the center of the opening, each upper side facing the central opening and having at least one spring element which is configured to engage in thread flanks of a threaded bolt when the threaded bolt is introduced into the opening,
      wherein the length of the circular arc between the at least two cylinder wall segments is at least as great as the length of an upper edge of a cylinder wall segment, and
      wherein each of the cylinder wall segments includes a detent lug on its upper edge, wherein each lug is configured to engage in a corresponding recess of the second identical component and to lock the two components together, and
   iii) recesses arranged between each of the at least two cylinder wall segments.

2. The component as claimed in claim 1 further comprising more than two cylinder wall segments.

3. The component as claimed in claim 2, further comprising centering elements arranged at the edge of the opening between the equidistantly arranged cylinder wall segments.

4. The component as claimed in claim 2, wherein the thermoplastic is a polyamide, polyamide 6, or polyamide 66, optionally reinforced with glass fibers.

5. The component as claimed in claim 2, which is produced by an injection molding process.

6. The component as claimed in claim 1, further comprising centering elements arranged at the edge of the opening between the equidistantly arranged cylinder wall segments.

7. The component as claimed in claim 6, wherein the thermoplastic is a polyamide, polyamide 6, or polyamide 66, optionally reinforced with glass fibers.

8. The component as claimed in claim 6, which is produced by an injection molding process.

9. The component as claimed in claim 1, wherein the thermoplastic is a polyamide, polyamide 6, or polyamide 66, optionally reinforced with glass fibers.

10. The component as claimed in claim 9, which is produced by an injection molding process.

11. The component as claimed in claim 1, which is produced by an injection molding process.

12. A decoupling assembly for an add-on part on a body structure of a motor vehicle, which comprises two identical components as claimed in claim 1 and a decoupling element made of an elastomer.

13. The decoupling assembly as claimed in claim 12, wherein the elastomer is an ethylene propylene diene rubber, a thermoplastic elastomer, or a crosslinked olefin-based thermoplastic elastomer.

14. The decoupling assembly as claimed in claim 13, wherein the decoupling element includes a central cylindrical channel.

15. The decoupling assembly as claimed in claim 13, wherein the decoupling element has a circumferential groove on its outside.

16. The decoupling assembly as claimed in claim 12, wherein the decoupling element includes a central cylindrical channel.

17. The decoupling assembly as claimed in claim 16, wherein the decoupling element has a circumferential groove on its outside.

18. The decoupling assembly as claimed in claim 12, wherein the decoupling element has a circumferential groove on its outside.

19. A method for vibration decoupling of an add-on part on a body structure of a motor vehicle, the method comprising steps of:
   introducing a decoupling element made of an elastomer and including a central cylindrical channel into a recess of a holder of the add-on part, and fixing the decoupling element in the recess,
   after introducing and fixing the decoupling element, plugging two components as claimed in claim 1 into the central cylindrical channel of the decoupling element from opposite sides of the recess of the holder of the attachment, and locking the two components together to form a decoupling assembly, and
   plugging the decoupling assembly onto a threaded bolt attached to a body structure of the motor vehicle, wherein plugging the decoupling assembly onto the threaded bolt further comprises causing spring elements of the decoupling assembly to engage in thread flanks of the threaded bolt and fix the decoupling assembly.

* * * * *